UNITED STATES PATENT OFFICE.

WATSON SMITH, OF LONDON, ENGLAND, ASSIGNOR TO LOUIS MERCK, E. A. MERCK, WILLY MERCK, AND C. E. MERCK, COPARTNERS AS THE FIRM OF E. MERCK, OF DARMSTADT, GERMANY.

CINEOL ARSENATE AND PROCESS OF MAKING SAME.

SPECIFICATION forming part of Letters Patent No. 705,545, dated July 22, 1902.

Application filed September 27, 1901. Serial No. 76,748. (Specimens.)

*To all whom it may concern:*

Be it known that I, WATSON SMITH, a subject of the King of Great Britain, residing at 34 Upper Park road, Haverstock Hill, London, N. W., England, have invented certain new and useful Improvements in Cineol Arsenate and Process of Making Same, of which the following is a clear, full, and exact description.

My invention relates, primarily, to a new and useful substance which is a chemical compound of cineol (eucalyptol) with arsenic acid and also to a process for producing the same, and, further, to a process for obtaining pure cineol.

Other natural ingredients (besides cineol) can be isolated by my invention from other oils besides eucalyptus and by the use of other mineral reagents besides arsenic acid.

My invention will be defined in the claims.

Said compound as obtained by the process hereinafter described is (when quite freshly prepared) a solid of white color and crystalline form. On being slowly heated it melts at about 95° centigrade. It is soluble in alcohol and in ether. Said compound by contact with the moisture of the atmosphere partially decomposes on keeping, whereby it acquires, even in sealed bottles, a pronounced odor of cineol, a yellowish color, a moistened-looking texture or grain, and a gradually more and more reduced melting temperature. By contact with water it is decomposed into its constituents—arsenic acid and cineol.

The process for forming this new compound may constitute part of a new process for isolating cineol from ethereal (volatile or essential) oils or other liquids containing the same.

The formula of the new compound, so far as determined by elementary analysis, is probably $C_{10}H_{18}O.AsO_4H_3$. Cineol is an odoriferous and therapeutic principle occurring in many of the volatile or ethereal oils, among them those obtained from certain species of eucalyptus. It is chemically classified by Richter as "an alcohol of a terpene," by Beilstein as "a camphor," the formula $C_{10}H_{18}O$ being in both instances assigned to it.

If arsenic acid, preferably in highly-concentrated aqueous solution, be mechanically mixed by agitation or otherwise brought into contact with cineol or an oil or other suitable liquid containing cineol, the cineol present combines with the arsenic acid, forming the compound above described. If the cineol be present at said act of admixture as a constituent or component or ingredient of an oil or other suitable liquid, it separates out from said oil or liquid and alone combines with the arsenic acid, leaving the other liquid substances behind, and thus forms the new compound, as described.

As an example of manufacture, add to eucalyptus oil containing cineol an aqueous solution of arsenic acid of about 75° Baumé. The addition of even a relatively small amount of the solution will produce some of the heretofore-described new compound; but I preferably add the solution in such proportionate quantity that upon any further addition of such solution no further formation of the compound would take place. This proper proportionate quantity may be easily determined beforehand by calculation based upon a preliminary trial on a small quantity of the oil. When the proper relative amounts required of the two liquids have thus been predetermined and are ready in convenient bulk for commixture, they are mixed very quickly with vigorous stirring until the mixture takes the form of a thick magma of crystalline particles of the above-described compound. From this magma the pure white crystalline arsenic-acid-cineol compound may be isolated by separating off the liquid part through the means of centrifugation, or of pressure, or of suction, or otherwise. The cineol may be isolated by merely bringing the crystals of this arsenic-acid-cineol compound in contact with water, whereupon the compound decomposes, the water taking up the arsenic acid and the cineol separating out. The cineol so obtained can afterward be perfectly purified by distillation. The watery solution of arsenic acid which remains from this operation can be evaporated, and the acid regained can be employed for a new operation, if desired.

I am aware that the above steps may be varied without departing from the spirit of my invention, and I therefore do not limit myself to the exact procedure heretofore described, nor do I limit myself to the use of the substances herein specifically named.

What I claim is—

1. The process of obtaining a compound of arsenic acid and cineol (eucalyptol), which consists in treating cineol with arsenic acid.

2. The process of obtaining a compound of arsenic acid and cineol, which consists in treating cineol, contained in a liquid, with arsenic acid.

3. The process of obtaining a compound of arsenic acid and cineol, which consists in treating cineol, contained in a liquid, with a solution of arsenic acid.

4. The process of obtaining a compound of arsenic acid and cineol, which consists in mixing eucalyptus oil containing cineol with an aqueous solution of arsenic acid.

5. The process of separating cineol from a compound, which consists in bringing an arsenic-acid-cineol compound in contact with water.

6. The process of obtaining cineol from a liquid in which it is contained, which consists in preparing from said liquid a chemical compound of arsenic acid with cineol, and splitting up said compound by bringing it in contact with water.

7. A chemical compound, consisting of arsenic acid and cineol, and characterized (when freshly prepared) as a solid, of white color and crystalline form; melting, when slowly heated, at about 95° centigrade; soluble in alcohol and in ether; and which, on contact with water, is decomposed into its components, arsenic acid and cineol.

8. The process of obtaining a natural ingredient of an essential oil which consists in treating the oil with arsenic acid, thereby forming a compound of said natural ingredient with said acid, separating said compound from the residual liquid mass, and splitting up the compound, thereby setting free the desired natural ingredient of the oil treated.

9. The process of obtaining cineol which consists in treating eucalyptus oil containing cineol with arsenic acid, thereby forming an arsenic-acid-cineol compound, isolating said compound, and splitting up said compound by bringing said compound in contact with water.

Signed at London this 20th day of August, 1901.

WATSON SMITH.

Witnesses:
W. ELFORD ROGERS,
J. SPAHN.